Oct. 30, 1934.    H. H. SCHIELER    1,979,122
FRICTION POWER TRANSMISSION FOR VEHICLES
Original Filed May 5, 1930    3 Sheets-Sheet 1

Inventor

Harry H. Schieler,

By Cushman, Bryant Darby
Attorneys

Oct. 30, 1934.  H. H. SCHIELER  1,979,122
FRICTION POWER TRANSMISSION FOR VEHICLES
Original Filed May 5, 1930  3 Sheets-Sheet 2

Inventor
Harry H. Schieler

Oct. 30, 1934.  H. H. SCHIELER  1,979,122
FRICTION POWER TRANSMISSION FOR VEHICLES
Original Filed May 5, 1930  3 Sheets-Sheet 3
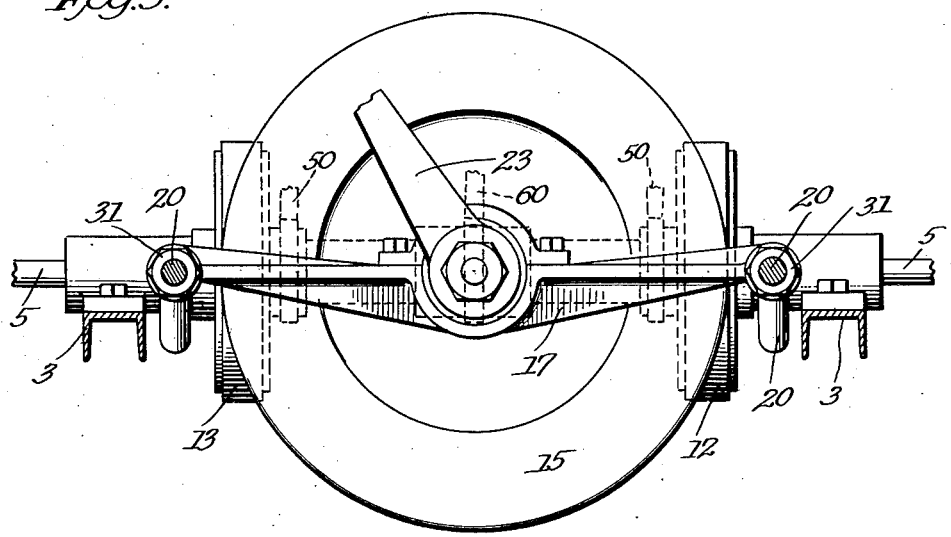
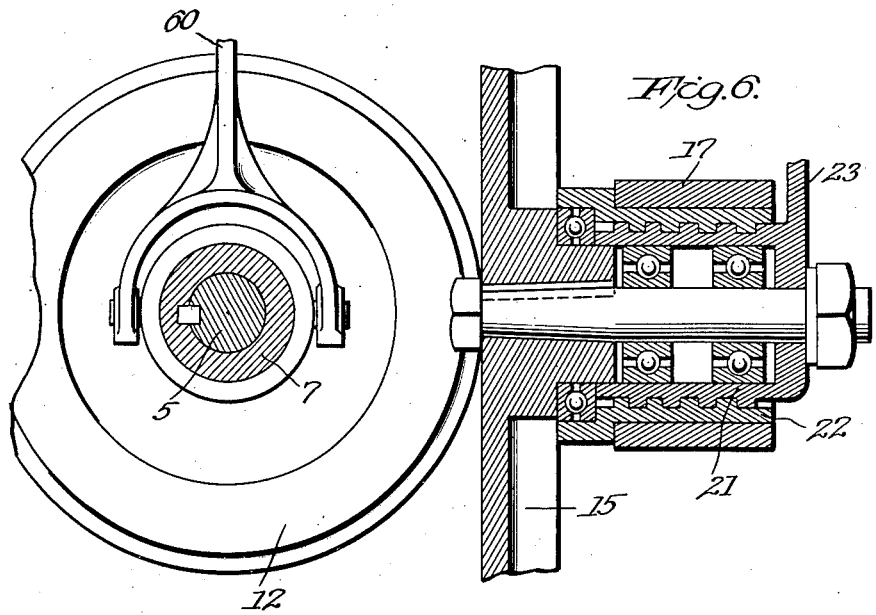
Inventor
Harry H. Schieler Patented Oct. 30, 1934

1,979,122

UNITED STATES PATENT OFFICE 1,979,122

FRICTION POWER TRANSMISSION FOR VEHICLES

Harry H. Schieler, Weiser, Idaho, assignor of one-half to Le Grand Young, Weiser, Idaho Application May 5, 1930, Serial No. 449,919
Renewed March 28, 1934

5 Claims. (Cl. 74—195)

The present invention relates to improvements in friction power transmission devices, particularly adapted for vehicles.

Among the objects of the invention is to provide a relatively simple means for propelling motor vehicles by friction drive devices, in which there will be a minimum amount of wear on the several parts and the speed, as well as direction of movement of the vehicle, can be easily controlled and varied.

While the invention may be employed for driving motor vehicles of various types, and is well adapted for use with vehicles in which the forward, steering, wheels are also employed as driving wheels, the accompanying drawings showing it as a means for propelling a railway car.

In the accompanying drawings:

Figure 5 is an elevation and partial section substantially on the line 5—5 of Figure 4.

Figure 6 is a detail view partly in section.

Figure 1:
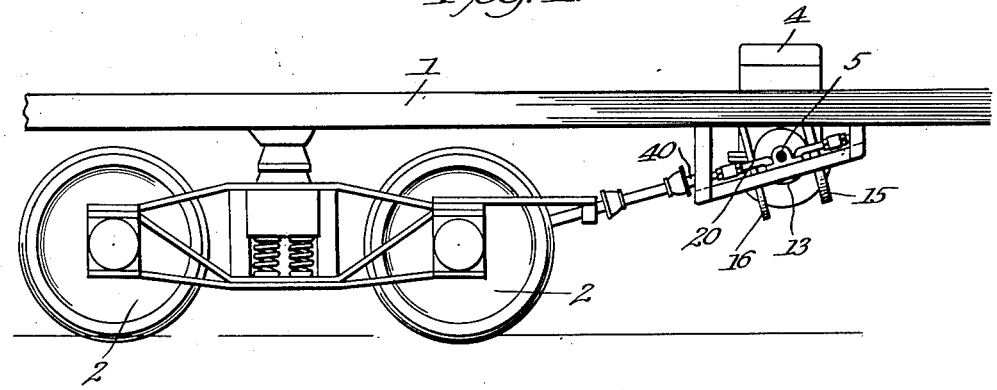
Figure 1 is an elevation of a portion of a railway car provided with an embodiment of the invention.
Figure 2:
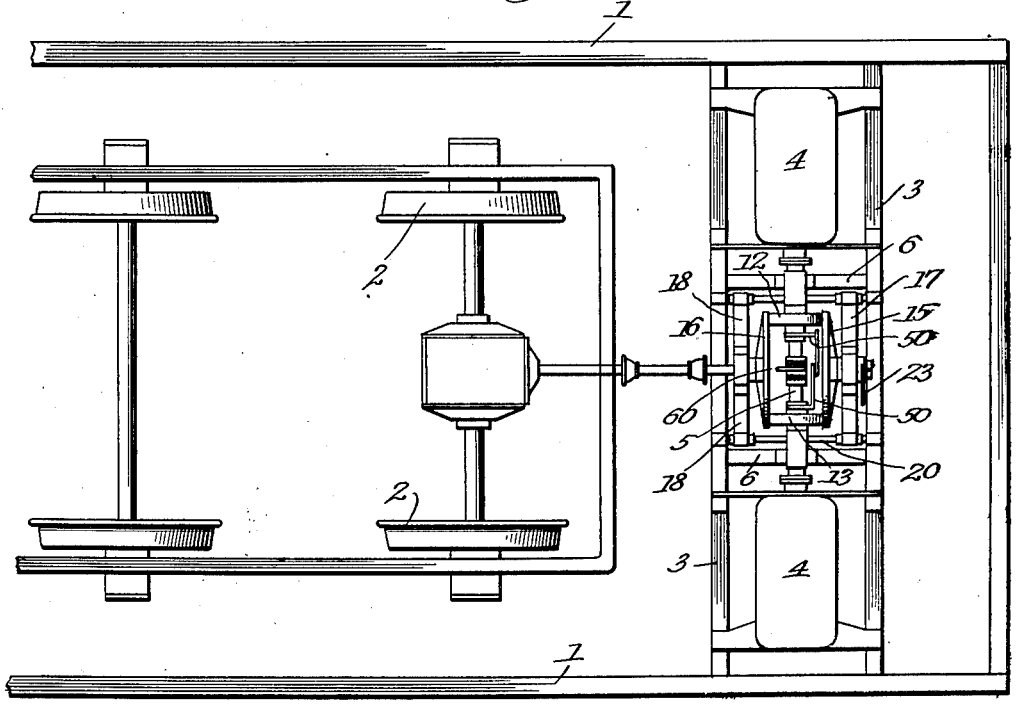
Figure 2 is a plan of Figure 1.

Referring to the drawings, in the several views of which like parts are designated by the same reference character, the embodiment of the invention illustrated includes a railway car frame, comprising side bars 1, and a truck in which are mounted track wheels 2.

As the invention is adapted for use with vehicles of various forms or types, the car is illustrated more or less conventionally.

On suitable cross bars 3, connecting the side members 1 of the car frame are mounted two motors or engines 4, both of which are adapted to drive a shaft 5, that extends transversely of the car frame.

Preferably, such motors will be internal combustion engines, and they will be arranged so that they will act to continuously drive the shaft in one direction.

The shaft 5 is mounted in suitable bearings on members 6, which are connected to and supported by the car frame members 3 and on said shaft about midway of its length is splined a clutch sleeve 7.

The clutch teeth at the ends of the sleeve 7 are adapted to engage, respectively, with similar teeth formed on the adjacent ends of sleeves 8, 9, which are mounted to rotate freely about the axis of the shaft 5, being preferably supported, as shown, on suitable roller bearings 10.

On said sleeves are, respectively, mounted friction drive wheels 12, 13, shown as having peripheral inserts 14 of fiber or other suitable material. The drive wheels 12, 13, are each connected by a spline to their respective supporting sleeves 8, 9, so that they may be moved longitudinally of the sleeves and the driving shaft 5.

With the friction drive wheels 12, 13, cooperate two friction discs 15, 16, arranged in parallel relation and supported in the opposite end members 17, 18, of an auxiliary frame, which includes longitudinally extending side members 20.

As shown, the friction discs are each provided with a hub that is mounted on anti-friction bearings carried by the cross members 17, 18, and an exteriorly threaded sleeve 21, engaging a threaded bushing 22, that is non-rotatably mounted in the cross member 17, is adapted to effect relative movement between the friction disc 15 and the auxiliary frame in which such disc is supported for a purpose to be hereinafter described.

As shown, the parts are so related that the axes of the driving shaft 5 and friction wheels 12, 13, thereon, and the axes of the two friction discs 15, 16, are all in a single plane and, as shown, both friction discs can engage both of the friction wheels, such engagement being at opposite sides of the center of each said disc.

The ends of the side bars 20 of the auxiliary frame are slidably mounted in fixed bearings 30 on the vehicle frame bars 3, and pass through suitable passages in the cross members 17, 18, of said auxiliary frame. Said side members 20 are shown as bowed or depressed to pass the driving shaft 5, and the cross members 17, 18, are adjustably connected with said side bar members, as by suitable nuts 31, engaging threaded portions 20a of the side members. The adjustment of the outer nuts 31, which are in abutting relation with the bearings 30, determines the range of movement of the auxiliary frame.

Figures 3, 4:
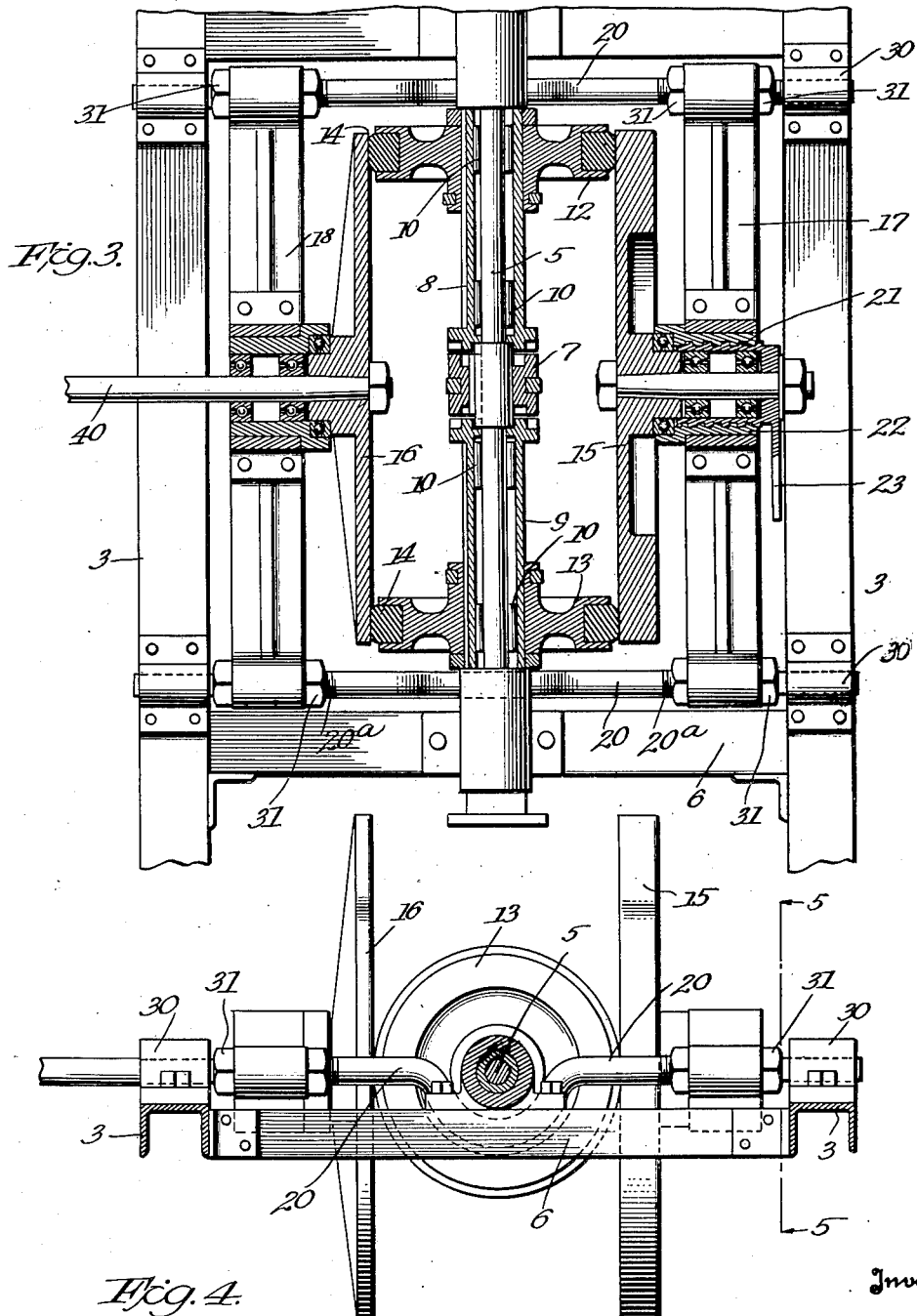
Figure 3 is a horizontal section, on an enlarged scale, of the friction power transmission device.
Figure 4 is an elevation of Figure 3, parts of the vehicle frame and driving shaft being shown in section.

A lever 23 is fixed to sleeve 21 for the manual rotation of the latter. Viewing Figure 3 and considering the disc and wheel axes to lie in a horizontal plane, rotation of sleeve 21 in a counter-clockwise direction will tend first of all to move disc 15 away from the wheels 12, 13 and the disc 16 will tend to move away from the wheels during the disengagement of disc 15, so that the drive is interrupted. When the drive is to be resumed sleeve 21 is rotated in a clockwise direction, thereby moving disc 15 into contact with the wheels. Hereupon the screw sleeve reacts against the frame to draw disc 16 against the wheels, so that due to the floating nature of the auxiliary frame, the wheels are clamped between the discs with an automatically balanced pressure.

Such adjustment of the friction disc 16 is preferably effected by turning the sleeve 21 by means of a suitable radially projecting lever 23. When the sleeve 21 is turned in one direction, it will be seen that, as the disc 15 and friction drive wheels 12, 13, form a fixed abutment, the auxiliary frame will be bodily moved in a direction to carry the friction disc 16 into or from engaging relation with the friction drive wheels, such movement being permitted, owing to the ends of the side members 20 of the auxiliary frame being relatively loose in the bearings 30.

A driven shaft 40 is connected with the friction disc 16, and such shaft may be connected to suitable gearing on the driving axle of the adjacent pair of wheels 2.

As shown in Figure 1, the axis of the friction discs 15, 16, and the driven shaft 40 is preferably inclined to the horizontal, so that there may be a direct, straight-line connection from the disc 16 to the driving axle of the car.

Due to the inclination of the disc axes a desirable result is obtained in that upon disengaging movement of sleeve 21 disc 16 and the auxiliary frame will gravitate away from the wheels, disc 15 initially remaining in engagement with the wheels to exercise a fly wheel effect thereon. Upon continued movement of sleeve 21, however, the left hand nuts 31, Fig. 3, (these being the lowermost nuts, Fig. 1) will abut the adjacent bearings 30, arresting further movement of the auxiliary frame, so that the sleeve 21 lifts disc 15 out of engagement with the wheels, this being necessary when changing speed or direction of drive. Upon resuming drive, disc 15 will first of all come into contact with the wheels and thereupon through the reaction of the sleeve against its abutment disc 16 will be brought into engagement with the wheels. While the screw and nut arrangement as shown is a preferred one, it will be evident that other power amplifying mechanism may be utilized as a substitute. It will also be evident that means other than gravity may be utilized to act on disc 16 in a direction away from the wheels.

When the shaft 5 is rotating and either of the sleeves 8, 9, is clutched thereto, the friction discs 15 and 16 will be rotated and the two friction drive wheels 12, 13, constantly in engagement with said discs will turn in opposite directions about the axis of the shaft. The disc 15 can be considered as acting in the nature of a fly wheel, and, as shown, is preferably made of increased thickness adjacent its periphery. As the friction drive wheels 12, 13, are constantly in engagement with the friction disc 15, and at opposite sides of the center thereof the wear between the disc and wheels will be uniform, and there will be no danger of forming undesirable "flat" surfaces on the disc.

By a relatively slight turning movement of the sleeve 22, the discs 15 and 16 can be brought into the desired contacting relation with the friction drive wheels 12, 13, and the power of the shaft 5 thus transferred to the driven shaft 40. The rate at which the shaft 40 is thus driven can be varied by moving the friction wheels 12, 13, lengthwise of their supporting sleeves and the axle 5. For this purpose each of said wheels is shown as provided with a shifting fork, the arms 50 of which may be connected by any suitable means, so that the wheels will be simultaneously moved in opposite directions toward or from the axes of the friction discs 15, 16.

A clutch shifting lever, conventionally illustrated at 60, is provided for moving the clutch sleeve 7 into engaging relation with either the sleeve 8, or the sleeve 9, in accordance with the direction in which it is desired to rotate the driven shaft 40.

It is believed that the operation and advantages of the improved invention will be readily understood from the foregoing description and the drawings, and it will be appreciated that in the drawings many of the parts are illustrated more or less conventionally, and that the invention is not, except as defined in the appended claims, intended to be limited to the exact arrangement of parts shown.

In the drawings, the parts are shown in the relation in which both discs are in contact with the friction driving wheels. When it is desired to rotate the driven shaft, however, the threaded sleeve 21 will, through the hand lever 23, be so adjusted that the auxiliary frame (17, 18, 20), will be moved bodily to carry the disc 16 out of frictional contact with the driving wheels 12, 13. A very slight movement of the hand lever 23 is sufficient to effect engagement of the disc 16 with the driving wheels or to disconnect the same, the auxiliary supporting frame having, as described, a limited movement in its bearings 30.

An important feature of the invention is that the several parts are arranged in a very compact manner, and occupy a minimum amount of space lengthwise of the vehicle frame. The construction enables the use of a relatively short driven shaft 40 and the parts can, of course, be related so that this shaft can extend at any desired angle to the driving axle of the car or vehicle.

I claim:

1. The combination with a vehicle having a propelling axle, of a substantially horizontal driving shaft mounted in bearings on the vehicle frame, two friction wheels supported to rotate about the axis of said shaft, means for connecting either of said friction wheels to the driving shaft, an auxiliary frame comprising side members extending transversely of the driving shaft and supported to move in the direction of the length of the vehicle frame and two cross bars connecting said side members respectively in advance and in rear of the driving shaft, a sleeve having a threaded connection with one of the cross bars of the auxiliary frame, a friction disc rotatably supported by said sleeve, a second rotatable friction disc supported by the other cross bar of the auxiliary frame in parallel relation to the first said disc, means for turning said sleeve to move the first said disc relative to the auxiliary frame and to move the auxiliary frame and second said disc relative to the first said disc and friction wheels, and gearing connecting the second said disc and the propelling axle of the vehicle.

2. The combination with a vehicle having a propelling axle, of a substantially horizontal driving shaft mounted in bearings on the vehicle frame, two friction wheels supported to rotate about the axis of said shaft, means for connecting either of said friction wheels to the driving shaft, an auxiliary frame comprising two side bars that extend transversely of the driving shaft and two cross or end bars connecting said side bars respectively in front and in rear of the driving shaft, the side bars projecting beyond both end bars, bearings on the vehicle frame receiving the projecting ends of said side bars and permitting the auxiliary frame to have a limited movement on the vehicle in the direction of the length of the side bars, a friction disc rotatably supported by a bearing on one of the end bars of the auxiliary frame, a second friction disc rotatably supported by the auxiliary frame in parallel relation to the first said friction disc on the opposite side of the driving shaft from the first said disc, means for moving the first said disc relative to the auxiliary frame and to move the auxiliary frame relative to the first said friction disc to bring the second said friction disc in driving contact with the two friction wheels, and gearing connecting the second said friction disc and the propelling axle of the vehicle.

3. Power transmission means comprising a pair of coaxially mounted friction wheels, a pair of coaxial friction discs having opposed faces engageable with said wheels, the disc axis intersecting the wheel axis between the wheels, said wheels being axially shiftable toward and away from the disc centers, a movable frame supporting said discs, means operable to move one of the discs relative to the frame to engage said one of the discs with the wheels and to move said frame relative to said one of the discs to engage the other of said discs with the wheels, said last-named means including power amplifying mechanism, and means limiting the movement of the frame.

4. Power transmission means comprising a pair of coaxially mounted friction wheels, a pair of coaxial friction discs having opposed faces engageable with said wheels, the disc axis intersecting the wheel axis between the wheels, said wheels being axially shiftable toward and away from the disc centers, means operable to shift the discs axially to engage and disengage them from the wheels, a frame supporting said discs and movable in the axial direction thereof, one of said discs being supported by said frame through the intermediary of an axial screw engaged with the frame, and means limiting the movement of the frame.

5. Power transmission means comprising a pair of coaxially mounted friction wheels, a pair of coaxial friction discs having opposed faces engageable with said wheels, the disc axis intersecting the wheel axis between the wheels, said wheels being axially shiftable toward and away from the disc centers, means operable to shift the discs axially to engage and disengage them from the wheels, a frame movable in the axial direction of the discs and in which the latter are journalled, the journal means for one of said discs being axially displaceable relative to the frame, means operable to effect such displacement to engage and disengage the discs with the wheels, said last named means including power amplifying mechanism, and means limiting movement of the frame in the direction of engaging movement of the displaceably journalled disc.

HARRY H. SCHIELER.